Feb. 8, 1944.     A. AMES, JR     2,340,856
DEMONSTRATING AND TESTING VISUAL SPACE PERCEPTION
Filed May 11, 1940       8 Sheets-Sheet 1
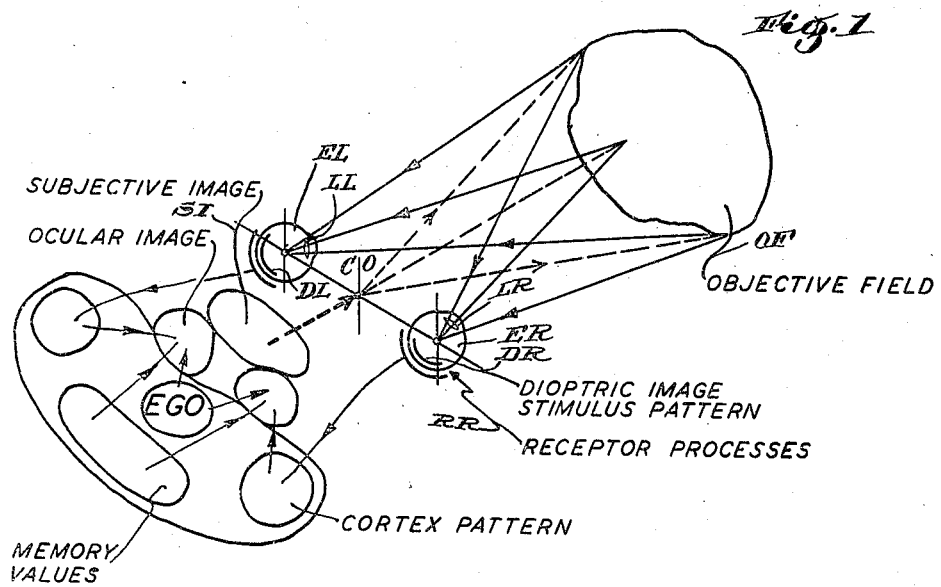
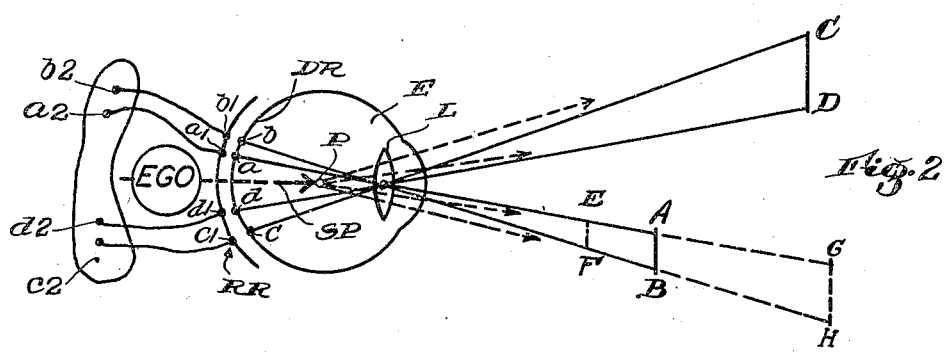
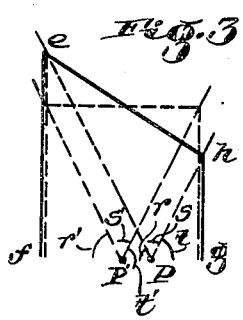
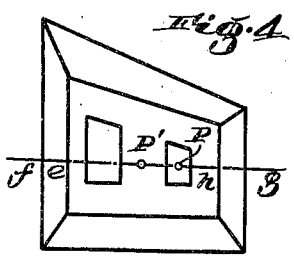

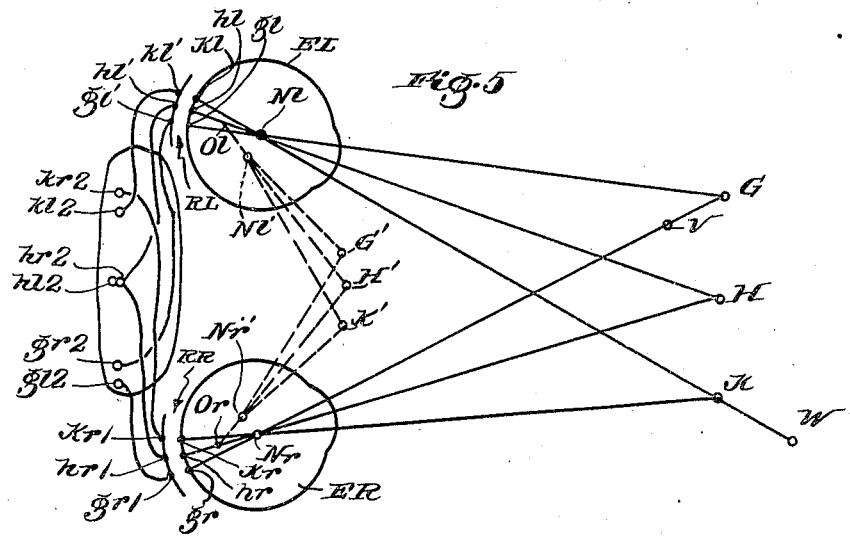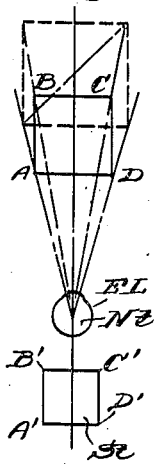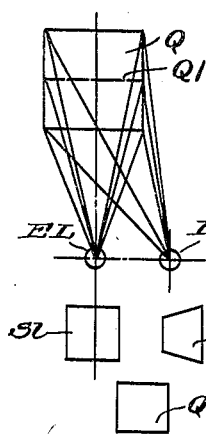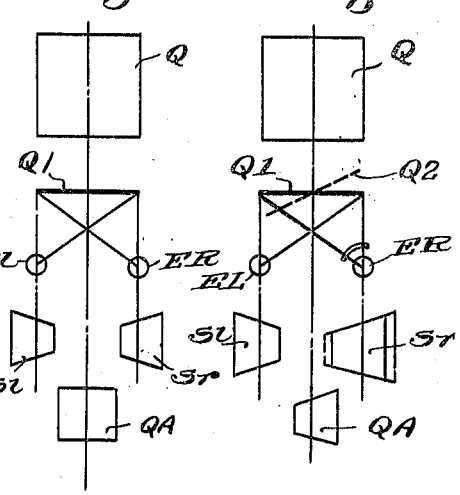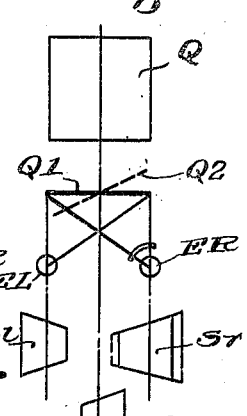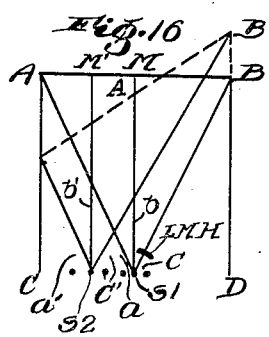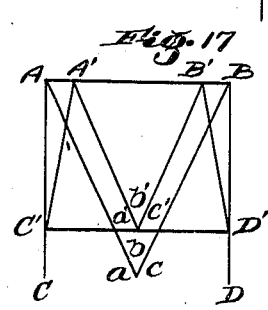

APPARENT DISPLACEMENT WITH CHANGING HORIZONTAL SIZE DISPARITY

APPARENT DISPLACEMENT WITH CHANGING VERTICAL SIZE DISPARITY

Feb. 8, 1944. A. AMES, JR 2,340,856
DEMONSTRATING AND TESTING VISUAL SPACE PERCEPTION
Filed May 11, 1940   8 Sheets-Sheet 4

Inventor:
Adelbert Ames, Jr.
by Roberts, Cushman & Woodberry
Attys.

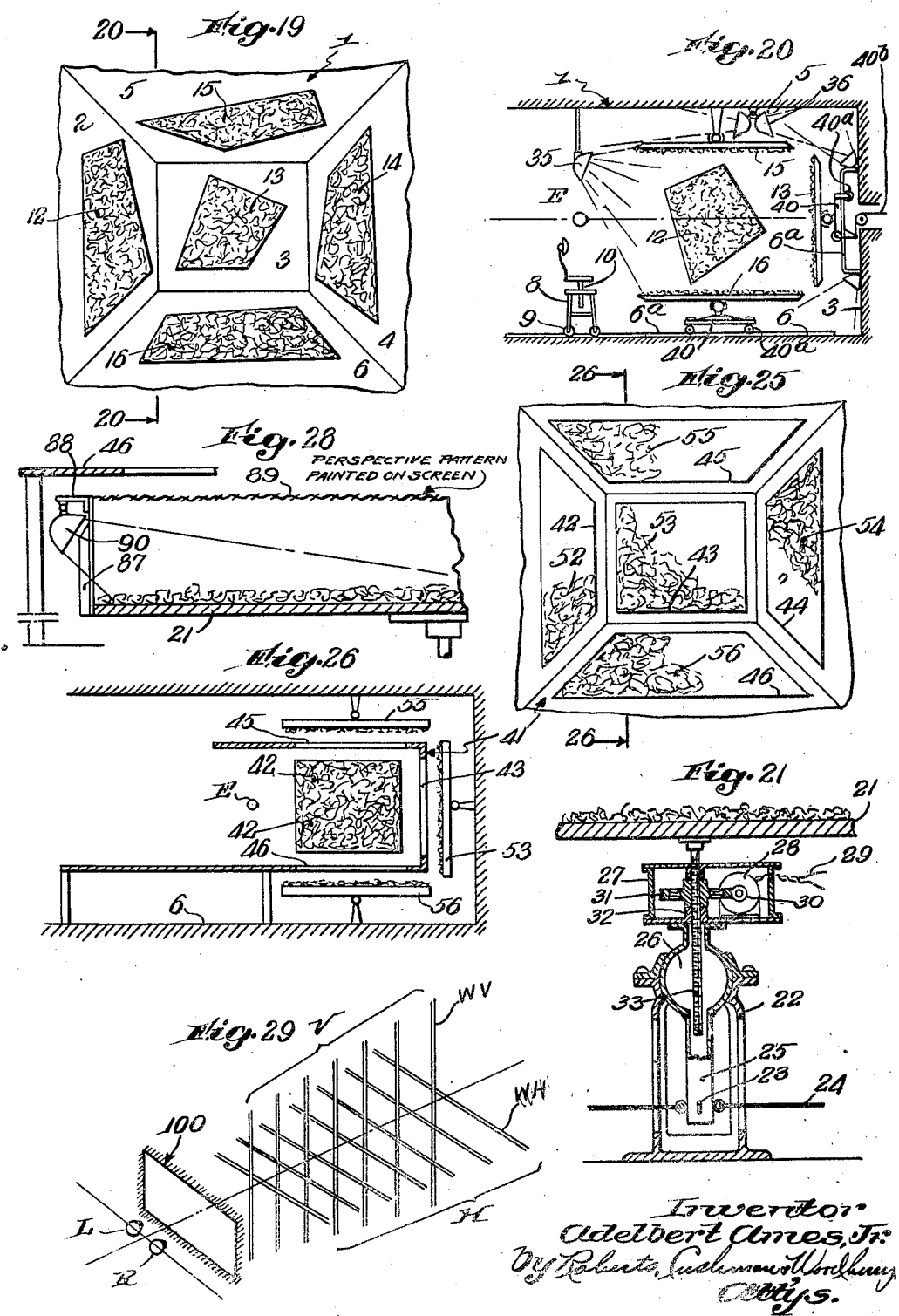

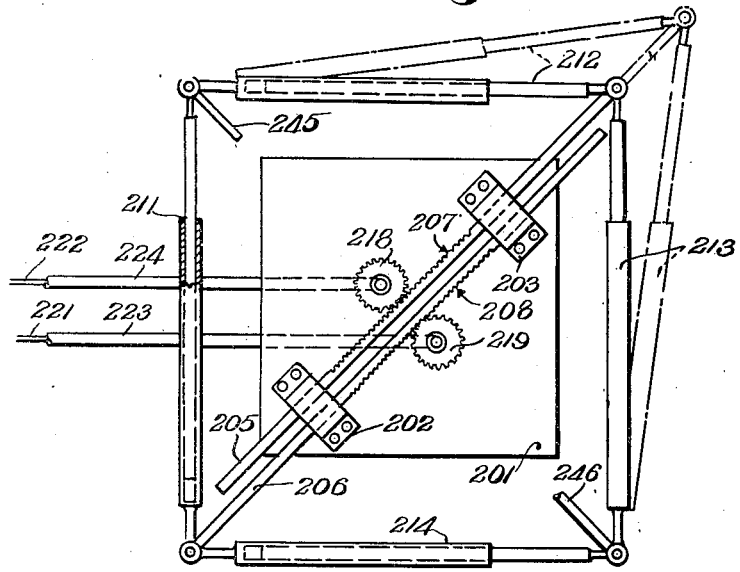
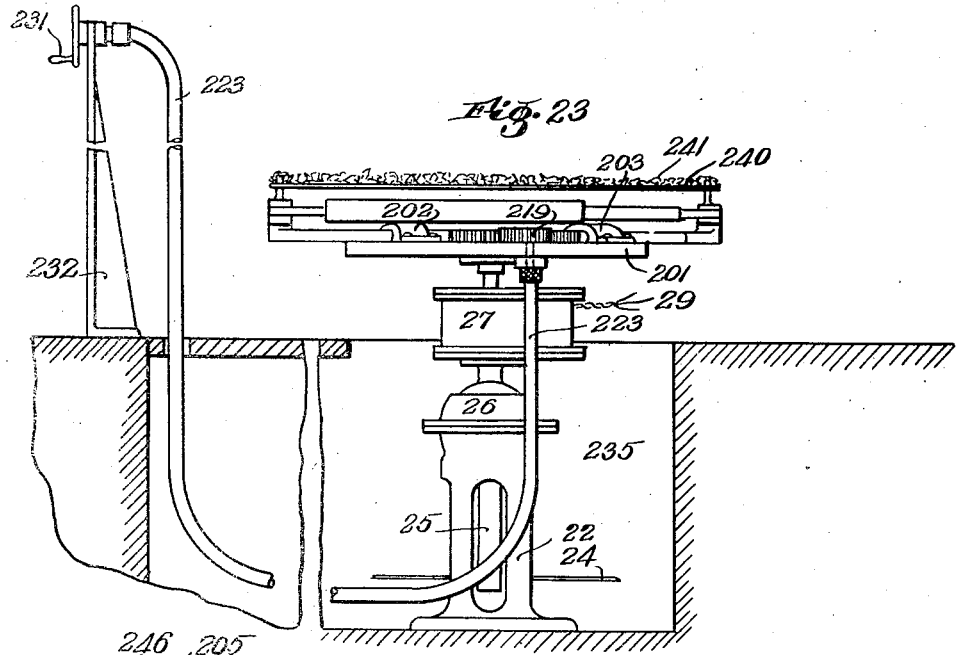
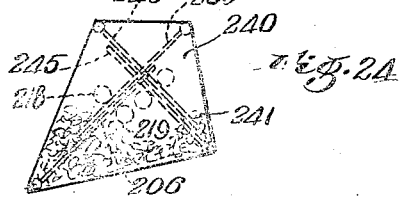

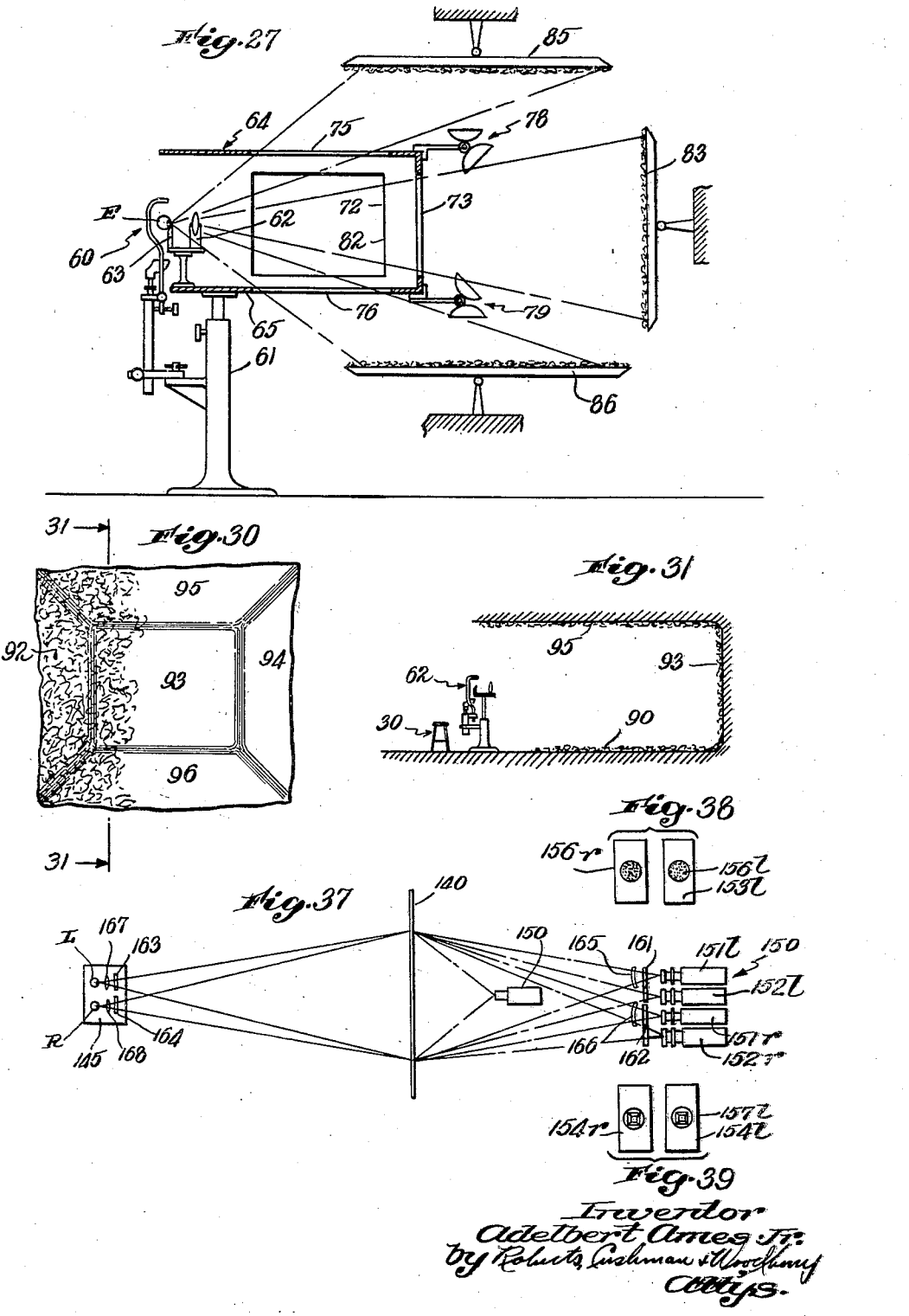

Feb. 8, 1944.  A. AMES, JR  2,340,856
DEMONSTRATING AND TESTING VISUAL SPACE PERCEPTION
Filed May 11, 1940  8 Sheets-Sheet 8

Inventor:
Adelbert Ames, Jr.,
by Roberts, Cushman & Woodbury
his Attys.

Patented Feb. 8, 1944

2,340,856

UNITED STATES PATENT OFFICE 2,340,856

DEMONSTRATING AND TESTING VISUAL SPACE PERCEPTION

Adelbert Ames, Jr., Hanover, N. H.

Application May 11, 1940, Serial No. 334,511

12 Claims. (Cl. 88—20)

This invention relates to physiological optics and more particularly to a method and apparatus for demonstrating and testing visual perception of space.

The invention is based on new discoveries concerning the factors that determine the visual perception of our three dimensional spatial environment, more particularly the discovery of new facts concerning the nature and relationship of the factors that affect spatial localization in monocular and binocular vision.

The "tipping field" test disclosed in Patent No. 2,168,308 is based on the comparison of predominantly stereoscopic space perception with so-called perspective perception or with the kinesthetic sense of localization. However, this previously described test employs test patterns extending preponderantly in one plane and, although it is very valuable and sufficient for many purposes, it reproduces only a particular aspect of the conditions experienced in actual visual space perception and, hence, is not suited to demonstrate or test fully all pertinent phenomena of such perception. For example, this previous test employs only one pattern or object inducing preponderantly stereoscopic space perception, whereas it was later found that comparison of two or more binocularly viewed test pattern components, or objects of similar character is often valuable in addition to comparison of space perception from different types of clues.

It is one of the main objects of the present invention to control the factors that determine spatial localization and sense of configuration, namely the shape of the stimulus patterns in one or both eyes, the differences or disparities between stimulus patterns in both eyes and the clues which give information as to the actual size and form of objects, and with the aid of such control to demonstrate the nature of space perception, to test it for the purpose of deriving ocular correction of faulty space perception, and artificially to reproduce spatial environment with controlled variations of the above factors.

Other objects are methods of demonstrating, detecting and measuring the effects on space perception of the above factors, of the lack of one or the other of these factors, and of inconsistencies therebetween, and to provide methods for isolating one or more of these factors for the purpose of demonstrating or testing their nature, mutual relation and effect upon vision.

Further objects are to provide apparatus for demonstrating and analyzing the mechanism of visual space perception, for deducting the effects of certain physiological phenomena or ocular variations or deficiencies upon space perception and vice versa, and for purposely introducing such effects into artificially simulated representations of visually discernible environment.

In one aspect of my invention I provide a test of binocular vision which permits the investigation of space perception under conditions simulating the objective field actually surrounding an individual, and not only of a selected more or less limited portion of that field. In another aspect, I provide a method, and apparatus, for testing binocular vision by comparing the simultaneous perception of at least two test objects of selected characteristics alone, or in combination with test objects of different nature. Another, correlated, object of my invention is to provide a comparatively simple test object, inducing space perception substantially only through pattern disparity, and which can be used either alone or together with other test objects, for carrying out ocular tests. In still another aspect, the invention provides objects or models especially suited for demonstrating and testing the shifting, under certain conditions, of the station point of an observer.

These and other objects, aspects and features of the invention will be apparent from the following detailed description of several practical embodiments thereof by way of illustrating its genus. This description refers to the drawings in which:

Fig. 1 is a diagram illustrating the processes of visual spatial interpretation;

Figs. 2, 3 and 4 are diagrams of monocular spatial interpretation;

Figs. 5 to 9 are diagrams of binocular spatial interpretation;

Figs. 15 to 18 illustrate the station point shift;

Figs. 19, 25 and 30 are perspective front views of testing arrangements according to the present invention;

Figure 33:
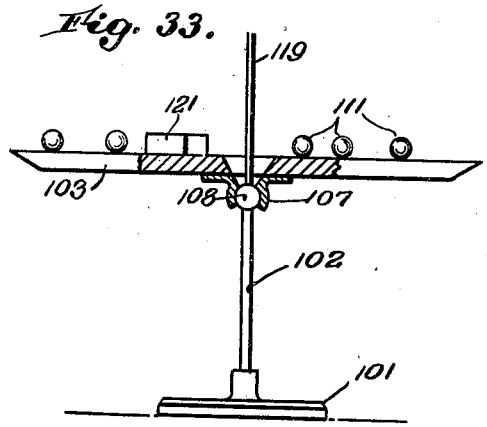
Figure 32:
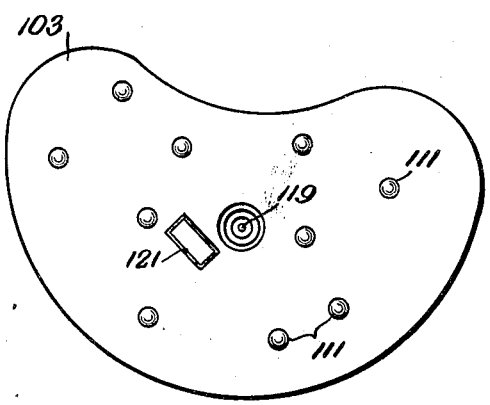
Figure 18:
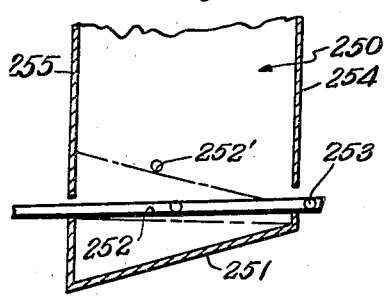
Figure 34:
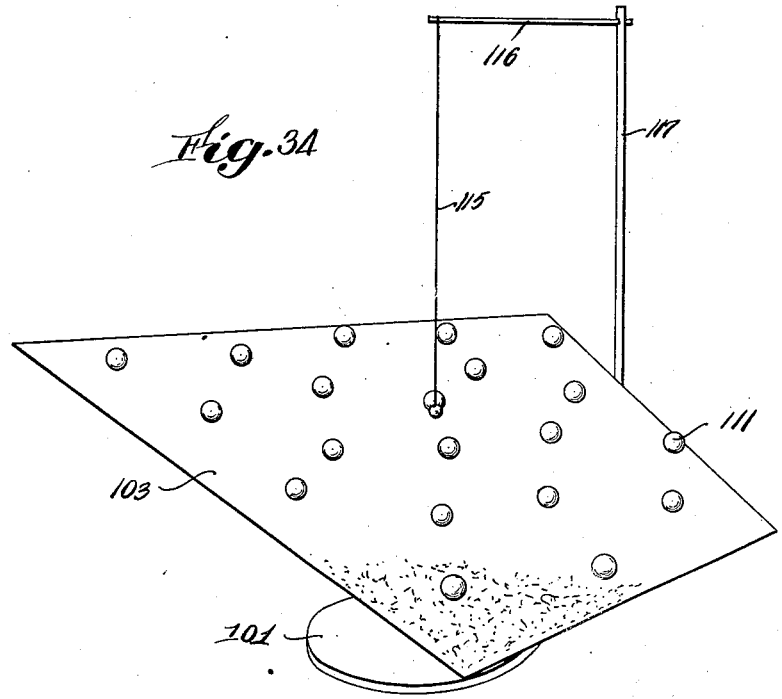
Figure 36:
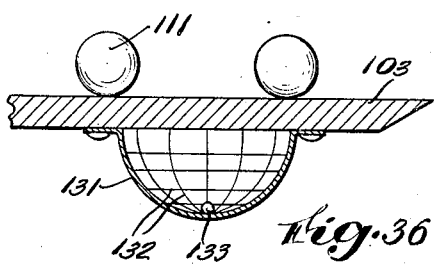
Figure 35:
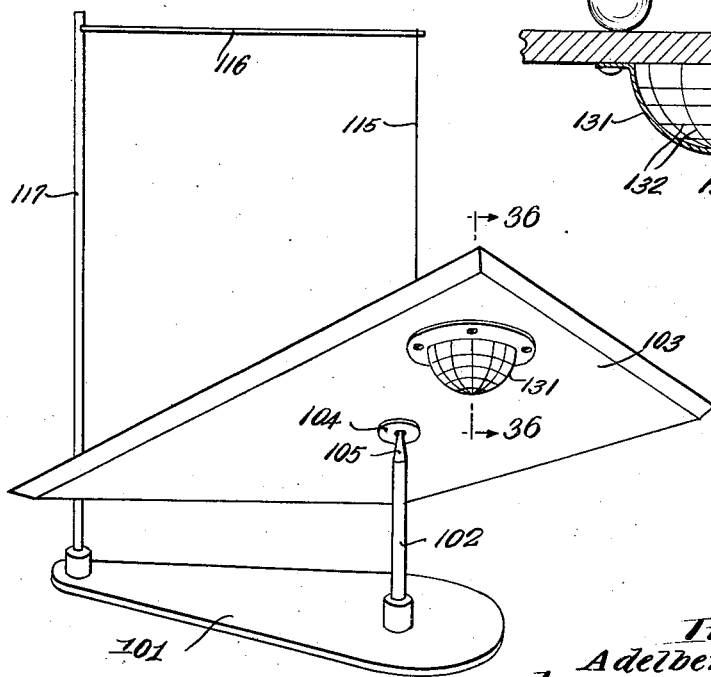

Figs. 20, 26 and 31 are sections on line 20—20, 26—26 and 31—31 of Figs. 19, 25 and 30, respectively;

Fig. 21 is a detail longitudinal section of a test target support which may be used with apparatus shown in Figs. 20, 26 and 27;

Figs. 22, 23 and 24 are top view with the sheet removed, side elevation, and top view, respectively, of a test target shape adjusting device;

Fig. 27 is a side elevation, partly in vertical cross section, of an embodiment of the invention, employing a head shield;

Fig. 28 is a section through a modified target table according to Fig. 26;

Fig. 29 is an isometric view of an embodiment of the invention employing series of parallel wires;

Fig. 32 is a top view of another embodiment of my invention;

Fig. 33 is a side elevation, partly in section, corresponding to Fig. 32;

Fig. 34 is an isometric front view of one embodiment of the instrument according to my invention;

Fig. 35 is a back view corresponding to Fig. 34;

Fig. 36 is a detail section on line 36—36 of Fig. 35;

Fig. 37 is a schematical plan of a testing unit for projected test objects; and

Figs. 38 and 39 are views of slides for use in the arrangement shown in Fig. 37.

An understanding of the present invention requires some familiarity with certain concepts of visual space perception which are to some extent explained in the above-mentioned patent, but which have been considerably enlarged and clarified by extended investigations and experiments. These concepts will first be shortly explained as far as relevant to the invention, with reference to Figs. 1 to 39.

(I) *Visual space perception in general*

Perception of the location and configuration of objects in space relatively to the observer and to each other is possible due to information concerning the objective world. This information is of two types: that which is being immediately received from the objective world in the form of visual values; and that which has been received in the past in the form of experiential, including visual, values.

(A) *Immediate perception.*—The immediate information is transmitted from the objective world to consciousness in the following manner. From every point in the "objective field" radiations are being projected in all directions; the welter of visible radiations is differentiated by the aperture of an eye. This aperture, as represented by the lens system LR, indicated in Fig. 1, directs all the radiations that originate from a particular point of the objective field OF at another particular point on the image plane of the eye ER. All of these conjugate image points taken together constitute a dioptric image DR of the objective field. This is of course true for the left eye EL as well as for the right eye ER.

This dioptric image constitutes an "external stimulus pattern" on the retina whose points have the potentiality of being differentiated due to their spatial distribution and their distinction in respect to wave length and amplitude of radiation.

The external stimulus pattern, which in itself can not be said to have color, brightness and spatial relationships (these being sensory responses), affects the "receptor processes" of the retina as indicated at RR of Fig. 1. The elaborate apparatus of rods, cones, nerve cells and branching connections converts the impinging light energy into electric potential by innumerable receptor processes. The discrete receptors are connected to the brain by individual transmitting nerve fibers, the nature of the impulses that pass along the nerve fibers being most likely the same for all types of stimuli. The totality of the stimuli transmitted through the receptor processes to the brain may be referred to as "cortex pattern"; like the stimulus pattern, it has the potentiality of being differentiated as to spatial distribution and radiation characteristics. The quality of the conscious sensation such as color and brightness or direction, distance and form is, however, due not to inherent characteristics of the stimuli to the brain, but to the associations evoked in consciousness when particular connections in the "central processes" are stimulated.

(B) *Memory values.*—As a further factor in the process of perceiving the objective field, the store of past experiences must be considered. This store or memory can be assumed to contain various "memory values" which are brought to consciousness by the external stimulus pattern induced by the immediately perceived objective field. Whatever it is in the organism to which the visual values have meaning and which may be taken as conceiving the objective field, and which for convenience may be called the "ego"—selects and combines the various memories of past visual experiences as they are being brought to consciousness by the external stimulus and cortex patterns of the immediately perceived external world, and composes them into the subjective patterns which is what we actually see.

(C) *Subjective image.*—This interaction between the external stimulus and cortex patterns received through the receptor and central processes brings into being two monocular and a binocular "subjective image", these images being indicated at SI of Fig. 1. A "subjective monocular image" is the integration of the stimulations received through one eye with the memory values as affected by the selective processes of the "ego"; this concept will herein be referred to for short as "ocular image" and corresponds to the ocular image defined for example in the above-mentioned Patent No. 2,168,308. The "subjective binocular image" is the integration of the stimulations from the two ocular images with the memory values, and will herein be referred to as "subjective image." This is what we see and, so to speak, project out into the objective field from an "observation center" CO.

The nature of the above-mentioned subjective image may be better understood by comparing it with concepts of tactual perception. In monocular vision, the external stimulus patterns themselves of vision, as well as touch, are inherently indeterminate with regard to the observation center, but assigned particular location values relatively to that center through proprioceptor processes. The tactual external stimulus pattern is primarily assigned to a fingertip, for example, and given direction and distance relatively to the observation center through the propioceptor processes in the muscles of body and arm. The visual external stimulus pattern is primarily assigned to a point of the retina and given direction relatively to the observation center through the proprioceptor processes in the extrinsic eye muscles. The differences between tactual and visual perception are also enlightening. Whereas the tactual sense ordinarily can not reach beyond the skin, the visual sense reaches out into space so to speak with the projected light rays as wands; on the other hand, the rudimentary sense of touch gives in addition to the direction also the distance, whereas the rudimentary visual sense gives a directional value only; further, the sense of touch does not easily differentiate relative directions of stimulus pattern components, whereas the visual sense is very sensitive in directionally differentiating such components, as will be explained more in detail hereinafter. Indeed, the highly developed innate association of exact relative directional values with particular points of the retina is the basis of our visual spatial localization.

(II) *Monocular spatial interpretation*

The subjective image from one eye can be conceived of as projected by a great number of lines radiating from the observation center of that eye. While the "relative directional values" corresponding to the angles subtended by these lines at the observation center are very exactly given, they furnish no basis for assigning to the various parts of the subjective image either "absolute directional values" related to the observer as a reference system or "distance values," which together could provide "form values" characteristic of the components of the objective field. Before such absolute directional and distance values and hence form values can be assigned to a visual sensation, further clues are necessary.

The extent to which the relative directional values of monocular vision can, together with other clues, furnish absolute directional, distance and form values will now be discussed.

(A) *Relative directional values*.—As indicated in Fig. 2, the component objects A, B and C, D of the objective field are by the lens system L of the eye E imaged at $a$, $b$, $c$ and $d$. These images impinge on the receptors in the retina at $a_1$, $b_1$, $c_1$ and $d_1$. Sensory impulses originating at $a_1$, $b_1$, $c_1$ and $d_1$ travel along their special nerve tracts to particular brain elements and constitute a cortex pattern indicated at $a_2$, $b_2$, $c_2$ and $d_2$. As a result of the activities of these particular centers correspondingly particular relative directional values are assigned to the subjective ocular image which is experienced or seen as if projected out into space from an observation center P in the eye with these particular relative directional values. These relative values, as the name implies, while giving definite clues as to the angular direction of each ocular image component to the other, give no information for assigning absolute directional values. The subjective image would be the same no matter where the objects were located in space as long as the eye was turned toward them. Before consciousness can assign absolute directional values to the pattern of the image it must have information as to the direction in which the eye is pointing.

(B) *Absolute directional values*.—When the eye moves in its socket the receptor processes move across the external stimulus pattern which is relatively fixed, as a finger is moved over an object stimulating the receptor processes at the end of the finger which alone do not give rise to an absolute directional value. Similarly, this stimulation of the receptors of the retina alone does not give absolute directional value, which, as already mentioned, could only be derived from the proprioceptor process in the external eye muscles, just as absolute tactual direction values are supplied by proprioceptor processes in the arm and trunk muscles. However, these kinesthetic clues, while giving information as to the approximate position of the eye in its orbit, do not determine it absolutely and hence absolute directional values are not provided by monocular vision, although such values are present to some more or less approximate degree. This presence is, in addition to clues derived from the external eye muscles, perhaps also due to clues derived from variations in the position of the dioptric image relative to the retinal receptor processes arising from the fact that the nodal point and the center of turning of an eye are not located at the same place.

(C) *Distance values*.—Although, with the aid of kinesthetic clues approximate absolute directional values can be assigned to every part of a subjective monocular image, these directional values can not furnish clues for assigning particular distances to the various parts of the subjective image. For instance, it is apparent that a projected image, such as AB (Fig. 2) would subtend the same directional values whether it was at EF or GH, or at any other distance in the cone G, P, H. Definite distance values can be assigned to the various parts of the image only if the approximate absolute directional values are supplemented by knowledge of the inherent nature of the objects that gave rise to the image, and by the relative directional values in the image. These together provide the "monocular depth clues."

The knowledge concerning the inherent natural characteristics of the objects themselves (such as their actual size, form, color, brightness) comes from the information that is stored in the mind from former experiences with objects of similar nature, as viewing them more or less closely from all points of view and perhaps touching them. From all of this information synthetic symbols (the above discussed memory forms of all past experiences with such objects) are created, in the totality of which exists our complete past experience. As indicated above, the cortex patterns have the potentiality to awaken certain groups of these memory values; the particular memory values out of these groups that come to consciousness are determined by the particular selective processes in operation which in turn are determined by importance and motivation reactions (ego) of the organism. It is these synthetic abstractions which are brought to consciousness by the external stimulus pattern.

This synthetic abstraction is characterized by particular memory values of size, form, color and brightness, and the stimulus pattern has in it the power to give rise in consciousness to these memory values which, in combination with the relative and absolute directional values immediately given by the stimulus pattern furnish a basis for assigning particular distance or depth values to the various parts of the pattern.

The monocular cortex pattern which makes the connections with the memory values may be functionally classified as derived either (1) from characteristics of a particular portion or component of the stimulus pattern, or from (2) characteristics of one such portion as compared with another one, or (3) from parallax due to relative movement of various portions, or (4) from kinesthetic phenomena arising in the eye muscles.

(1) Any characteristic which changes with variations in the distance and position of the pattern component or object will give clues for assigning absolute distance to the stimulus pattern. Such characteristics of the pattern component are size, color, detail, including sharpness of edge, and aberrations, including color of the edges. The reliability of these clues is not very great since they depend not only on absolute memory values of the objects giving rise to the images, but also upon atmosphere and other conditions subject not only to variation but misinterpretation; in comparison, the characteristic of "form or configuration" plays a more important role. If a particular memory value is assigned to a pattern component, particular relative distances will be assigned to its various parts. For instance, if a pattern portion is interpreted as a table top, the knowledge of form will give information as to the distance of objects on the table top. Illumination and shadows which supply information as to the nature of forms, play an important role.

(2) A comparison of the above-named characteristics of two pattern components in the ocular image will give clues for assigning relative distance values to the components. Of these, by far the most important are the clues derived from the comparison of the relative sizes of image components as given by relative directional values.

Referring again to Fig. 2, the relative angular size of the cortex pattern components $a2$, $b2$ and $c2$, $d2$ is definitely determined, as above pointed out. If memory values of the relative size of the objects AB and CD that gave rise to these component patterns are available, there exists a basis for assigning definite relative distance values to the two components. For instance, if the angular size of the component $a2$, $b2$ is twice that of $c2$, $d2$ and if it is known that the objects are two men of the same height, then definite clues exist for seeing the component $c2$, $d2$ twice as far away as the component $a2$, $b2$, although they do not give a basis for assigning absolute distance values.

Differences in color, detail and edges of the pattern components and their overlay also give a basis for assigning relative distance values, but as these characteristics are not as definitely correlated with differences in distance as is the size of the image, they are not as reliable.

The term generally used to describe this type of interpretation is "perspective."

Interpretation of memory values due to perspective clues of the stimulus pattern can be defined as the assigning of relative distance values to various subjective image components on the basis of differences in the size of these image components induced by different objects whose nature is known.

That by far the most effective clues for assigning distance values to the visual impressions received from one eye, are those that are derived from the comparison of the sizes and shapes of stimulus patterns of objects whose nature is known, can be demonstrated by the visual experience that results from observing artificially constructed object fields containing well known objects of abnormal size and shape.

An example of such a structure is a "distorted room" as shown in Figs. 3 and 4.

This room is so constructed that, at a station point P at one-third of the distance from the right to the left wall, its corners subtend the same angles as would the corners of a rectilinear room at a station point P' at a point in the center between these side walls, so that angle $r$ will be equal to $r'$, $s$ to $s'$ and $t$ to $t'$, as indicated with dotted lines in Fig. 3.

When such a room is observed monocularly from the station point P it will appear rectilinear. The sides $f$, $e$ and $h$, $g$ will appear the same size and distance, the floor and ceiling horizontal and the back wall normal to the observer; it will appear just as if one were observing a rectilinear room from the station point P'.

The reason for this illusion is that we will assign equal distance values to objects subtending the same visual angles if we believe them to be of the same size.

The effectiveness of this type of clues, which will herein be associated with the word "form," is evidenced by the fact that the above illusion can not be destroyed by kinesthetic, parallax, convergence or accommodation clues, by shadows or any other clues arising from monocular vision.

(3) A relative movement of the pattern components in one eye may result from either movement of the head, movements of objects in space, or a movement of the eye in its socket.

With a lateral movement of the head all objects in space move at different rates, depending upon the relative distances of the objects that give rise to the pattern. From the relative rates of movement very definite distance values can be assigned to the various components. When the observer is stationary and the objects move, the movement of the dioptric images from near objects is greater than that from more distant ones, provided the actual movement of the objects is the same. With the turning of the eye in its socket a simliar relative movement of the images of objects at different distances takes place as it does when the head is moved, though more complicated in nature. This is due to the fact that the center of turning of the eye is displaced back of its nodal point.

(4) Accommodation and convergence or relaxation and divergence of the eye gives indications as to whether the object looked at is near or far.

(III) *Binocular spatial interpretation*

The clues to space perception that result from using the two eyes together, that is, binocular vision, will now be considered.

The basic difference between monocular and binocular vision is that, while monocular vision has but one external stimulus pattern, in binocular vision there are two such patterns which, due to the separation of the eyes, are different because with a given distribution of objects in the objective field different stimulus patterns will be formed in the two eyes; the word "disparity" will herein be used to connote this relative difference.

(A) *Binocular localization of the objective field.*—As was pointed out in the above discussion of monocular vision, very exact relative directional values are assigned to every part of the subjective image (ocular image) of each eye. It follows that equally exact directional values can be assigned to each particular part of an ocular image relative to particular parts of the ocular image of the other eye; in order to illustrate this concept, the conventional deduction therefrom will first be discussed with reference to Fig. 5.

The external stimulus pattern $gr$, $hr$, $kr$ in the right eye from the objects G, H, K, gives through receptor processes $gr1$, $hr1$, $kr1$ rise in the brain to cortex pattern value $kr2$, $hr2$, $gr2$; and through the left eye $kl2$, $hl2$ and $gl2$. The relative direction in which the patterns $kr2$, $hr2$ and $gr2$, and $kl2$, $hl2$ and $gl2$, respectively will be seen is definitely determined by the particular brain connections affected by the respective stimuli.

The angular relationship between the directions in which $kr2$, $hr2$ and $gr2$ will be projected from the nodal point $Nr$ of the right eye is such that the angles G $Nr$ H and H $Nr$ K remain constant; that is, the stimulations from the objects G, H and K must always be seen in the same characteristic relative directions no matter how the eye turns. The same is true of the stimuli received from the left eye $kl2$, $hl2$ and $gl2$, which will always be seen in the characteristic relative directions determined by the angles G N l H and H N l K.

Not only does the ratio of the two angles associated with each eye remain constant, but the angles from one eye have a fixed relationship to those in the other which will continue to hold no matter how the eyes are turned. If we assume a definite position in space such as H at which the two directional values $hl2$ and $hr2$ are projected, then the stimulations $kr2$ and $kl2$ (granting they are similar in form) will be interpreted as one object at K and nowhere else. And the stimulation $gl2$ and $gr2$ (granting they are similar in form) will be interpreted as one object at G and nowhere else.

It is apparent that objects in other positions than G and K, say at V and W, would give rise to stimulations with characteristically different directional values which would require assigning to them other particular unique positions in space.

The above is a brief exposition of the accepted explanation of depth perception with binocular vision.

In past investigations in this field it has been assumed that the directional values associated with corresponding retinal points on the two foveae intersect at some particular point in space and it was further assumed that, with such a point in space as an origin, the spatial locations relative to that origin of other stimulations with particular disparities could be accepted as being determined. This gave a basis for accurate relative localization, but failed to disclose a basis for the absolute localization that actually exists.

There is, in fact, no ground for assuming an absolute localization for any two directional values. The only clues which could indicate that the directional values associated with the two foveae are referring to a particular point in space are the inaccurate kinesthetic clues from the extrinsic muscles that give information as to the direction in which the two eyes are pointed. There is nothing in the visual clues from a single point object that alone indicates its spatial position. They could be satisfied by a point anywhere in space.

However, the binocular clues derived from more than two points do give a basis for absolute localization.

It can be mathematically shown that, if the objective field consists only of three points there exists a basis for absolute localization if they remain in their plane; there are, however, other positions where they would give the same directional clues. For example, points G', H', K' in Fig. 5 subtend at the nodal points the same angles as those subtended from points G, H, K and will therefore stimulate the same subjective image as points G, H, K.

Mathematical analysis shows further that the particular angular relationship to the two eyes of four discrete object points is unique. That is, the angular relationships would be different if the four points were located anywhere else, apart from that locus of position that would result from rotating the points about an axis passing through the centers of the two eyes; this condition will be considered later.

For instance, assume in Fig. 5 that G, H were two vertical lines of the same length instead of points. It is apparent that if they were moved vertically right or left, up or down, or forward and back, they would subtend different angles to the two eyes. If they were moved into the two points G', K', the horizontal angular conditions would be satisfied but it is apparent that the vertical angle subtended to the right eye, for example, by a line at G' relative to the vertical angle subtended by a line of the same length at K' would be greater than if the two equal lines were at G and H.

The above-mentioned locus must, however, be particularly considered. It is apparent that, geometrically, no matter how complicated a group of objects might be, clues derived from the two eyes can give no basis for unique localization in that area in space which is determined by rotating this object group around an axis through the centers of rotation $Ol$ and $Or$ of the two eyes.

Physiologically, however, such an area of undetermined localization does not actually exist. It is well known that the cyclotorsion of the two eyes of a person with normal vision varies systematically with the direction and distance of gaze. The excyclotorsion increases when looking up and in near vision, and decreases with distant vision and looking down when it turns to incyclotorsion. As a result, characteristic visual clues in terms of "cyclo disparity" are associated with every particular direction in the vertical meridian at which the eyes are looking.

Another physiological function of the eyes produces changes from near to distant vision, namely, the so-called asymmetric disparity ("Hering-Hillebrandt") horopter deviation. As a result, visual clues in terms of "asymmetric disparity" are associated with every particular distance at which the eyes are looking.

The above discussed geometrically exact space perception clues resulting from the disparity of the directional values from each eye together with those derived from variations in functional cyclo disparity and asymmetric disparity give a basis for absolute localization; that is, any real object consisting of more than two points will produce unique visual clues which can be interpreted as corresponding to one and only one position in space, and which tell the observer where objects are relative to himself, whether they are near or far, to his right or left, or up or down, provided of course that the observer's vision is in this respect normal.

The best authorities (as represented by Hering, Hofmann and Tschermak) agree that these relative directional values associated with the stimulation of particular receptor processes in the two retinas are innate, that is, nativistic and not empirical, that is, they are not subject to being learned through experience or reinterpreted as the above-mentioned monocular clues.

(B) *Localization and form.*—If clues exist for assigning an absolute position to an object comprising more than two points relative to an observer, these clues must also provide a basis for assigning absolute size and form to its stimulus pattern.

For evaluating the differences between two stimulus patterns, the form of the individual patterns must be known. That is, disparity of monocular patterns, which is the basis for binocular assignment of localization, can be effective only because the relative directional values associated with every part of each ocular image are determinate, as above pointed out. When the two eyes are used together, there is present knowledge both of the shape of each individual stimulus pattern, and of their differences. These two types of information are interdependent. In our visual experience the form into which we interpret the stimulus patterns of particular shape depends upon the position where the stimulus patterns are interpreted as being localized in space and, conversely, the positions in space allocated to these patterns depend upon their shape.

These two types of information (namely, the form of each individual monocular stimulus pattern determined by its directional values, and the binocular disparity of the stimulus patterns) give the basis not only for assigning an exact absolute localization to the binocular stimuli, but also for assigning an exact form to them.

Again considering the relationship between localization and form in monocular vision, it will be remembered that the only determinate subjective clues in monocular vision are the directional values associated with particular receptor processes. These give information as to the components of the stimulus pattern and determine its shape. They do not give information either for assigning distance values to the stimulus pattern, or assigning form values to it. As also explained earlier, clues other than those that can be derived from the stimulus patterns themselves must be used in order to assign distance values or form values to it. These include so-called "perspective clues" which are derived from a knowledge of the actual size and nature of the various parts of the stimulus pattern; the "parallax clues" also play an important role. When there are enough of these types of what might be called empirical clues, relatively exact directional and shape values can be assigned to a monocular stimulus pattern.

When the two eyes are used in binocular vision the knowledge derived from the two stimulus patterns themselves, entirely apart from the empirical clues above mentioned, gives exact information for assigning particular spatial location and form to the stimulus patterns.

These concepts, which are very important for an understanding of the present inventon, will be further clarified by the following explanation of an example with reference to Figs. 6 and 7.

It may be assumed that one eye EL is looking at a square ABCD (Fig. 6). The stimulus pattern Sl will have the form of a square A', B', C', D' and give rise in consciousness to a subjective image having directional values as determined by angles A N1 B, A N1 C, etc. But the knowledge of these angular directional values of the various pattern components gives no information for assigning a particular distance to the object in the objective field; the same subjective pattern could be produced by other squares, as for example indicated in dotted lines. Nor does the stimulus pattern give information concerning the form of the object; the same subjective image could be produced by trapezoids as for example indicated in dot and dash lines. Some indication of localization and form would be provided by "perspective clues," for example if it were known that the side AB is of the same length as the side CD.

If both eyes are used the stimulus pattern Sl from the left eye EL would be a square, the pattern Sr from the right eye ER a trapezoid, as indicated in Fig. 7. The clues from the stimulus patterns separately give no information for assigning distance or form to the object that gave rise thereto; either pattern alone might be interpreted for example as a trapezoid or a square. On the other hand, the clues from the two stimulus patterns Sl and Sr taken together furnish information for particular and unique directional and distance values and also for form values; the pattern disparities determine the position of the object in the subjective image. As a result, both eyes individually and together see a square situated in the frontal plane at a distance of say 40 cm.

(C) *Induced disparities.*—The inherent relationship between form and localization becomes especially apparent when anomalous changes in the disparity of the stimulus patterns are introduced.

Small changes in the disparity have a very slight effect on the shape of the stimulus patterns as a whole, but a marked effect on the position in space in which the stimulus patterns will be localized as subjective pattern, and therefore have a marked effect on the shape values assigned to the stimulus patterns in the subjective pattern. This will be better understood from the following explanation referring to Figs. 8 and 9.

It may be assumed that the eyes are looking at a square Q normal to the line of sight as shown in front elevation in Fig. 8. The dioptric images in both eyes will be substantially identical as indicated at Sl and Sr. The figure will appear in the position Q1 (shown in top elevation in Fig. 8) and its form will appear square as indicated at QA. Now suppose the size of the image in the right eye is meridionally increased say 3% by means of a size lens to the size shown by the dotted line to the right and left of image Sr of Fig. 9. The object will appear to have taken the position shown by Q2 and its form will no longer appear as a square but as a trapezoid QA' with one side much shorter than the other and with the top and bottom sides slanted. The relative directional values of the various parts of the stimuli are such that the two sides of the figure subtend substantially the same relative angles and the question arises how the square stimulus pattern can be interpreted as a figure in which the two sides appear to subtend unequal relative angles. Actually, the stimulus pattern is interpreted to represent a tipped object, and since a tipped trapezoid projects into a square pattern, we see a trapezoid form because the stimulus is square.

This shows clearly that there is an inherent relationship between the form clues due to the innate relative directional values received from the monocular patterns on the one hand and the disparity of the directional values from the two binocular vision patterns on the other hand and that, in using the two eyes together, clues are received that are the basis for assigning not only particular localization in space to the stimulus pattern, but also particular form.

The effect on space perception of pattern disparity will become quite clear from the following discussion of certain typical situations.

(1) *Cyclo disparity.*—This type of disparity exists if the two ocular images of a given meridian of the objective field are inclined. This relative inclination of pattern meridians corresponding to a single objective field meridan is called declination; if the upper ends of the pattern meridians are tipped templeward, the condition is called disclination or incyclo disparity, and if these upper ends are tipped nasalward, the condition is called conclination or excyclo disparity.

The ocular images of a line in the median plane and normal to the direction of gaze will not have cyclo disparity. If such a line is rotated within the median plane its patterns will assume an excyclo disparity if the upper end is nearer to the eyes than the lower, and an incyclo disparity if the lower end is nearer; these disparities decrease with the line moving away from the eyes and disappear if the line is at infinite distance. Also, the cyclo disparity of the two images will change with varying inclination of the line kept at the same distance from the eyes; the more the upper or lower end, respectively, tips towards the eyes, the more will the excyclo or incyclo disparity, respectively, increase. Consequently, a horizontal or vertical line in the median plane and respectively above or below the eye level will cause excyclo disparity, and similarly located vertical and horizontal lines incyclo disparity; compare Fig. 10 which clearly indicates these conditions.

It will not be evident that increasing excyclo disparity of the patterns of line $la$ (Fig. 10), for example, may be interpreted either as a moving closer to the eye of the line in the objective field, or a tilting down of the near end, and that corresponding relations exist between the other positions and the pattern disparity of the line in these positions. Vertical or horizontal planes through lines in the above positions follow the same rules.

If, instead of moving the line or plane, the cyclo disparity is artificially changed (for example with glasses according to Patent No. 2,230,993 of February 11, 1941), or if it is physiologically defective, the subjective image will be affected as if the objective field had undergone a certain dislocation. Considering, for example, two horizontal planes $pa$ and $pb$ (Fig. 10) above and below eye level, respectively (ceiling and floor of a room), introduction of an excyclo disparity will either apparently lower both planes relatively to the observer (or lift the latter's station point) or tip the planes, with the near edge of the upper or lower plane turning downwardly or upwardly, respectively. Whether the apparent dislocation is a parallel shift or a rotation depends on the relation of cortex patterns and memory values, respectively. For example, strong perspective clues may be ineffective if shaped as described with reference to Fig. 6; an objective field with few perspective clues (for example, a meadow) may appear tipped, whereas, for example, the floor of a conventional room or of a water surface with waves will not appear tipped but lowered or raised because the memory values of a floor or a water surface strongly oppose any tilting which would not conform to experience.

Figure 10:
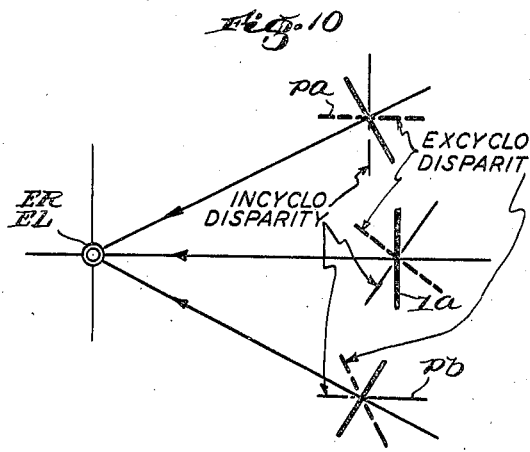
Figs. 10 to 14 illustrate several types of pattern disparity.
Figure 11:
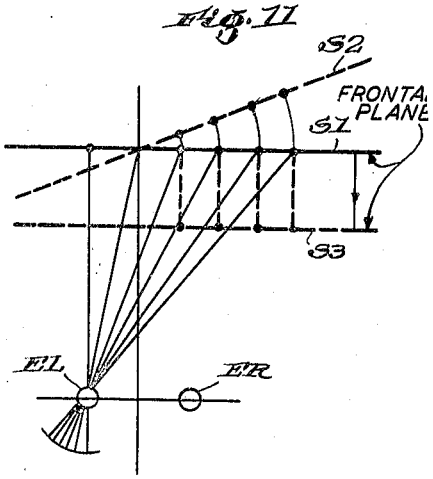
Figure 12:
Figure 13:
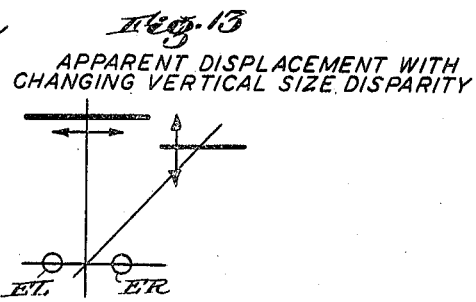

(2) *Asymmetric disparity.*—Referring to Fig. 11, it will be evident that points at equal distances in a frontal plane will not be imaged at equal distances, but that a certain asymmetric pattern disparity (known as the previously mentioned Hering-Hillebrand variation) will be introduced. This disparity changes with changing object distances as well as with tilting about vertical axes, compare the series of points $s1$, $s2$ and $s3$ of Fig. 11; it conforms to the prismatic distortion at length discussed in my Patent No. 2,118,132. Artificial introduction of such disparity, for example with lenses according to the above patent, brings the objects closer and makes them appear smaller, the latter on the principle that of two objects subtending the same angle at the eye, the farther object will be interpreted as larger, and vice versa.

(3) *Size disparity.*—Disparity of the two patterns of an object field in the horizontal direction may be interpreted as tipping (I in Fig. 12), as sidewise displacement (II in Fig. 12), or as an unsymmetrical in and out displacement (III in Fig. 12), or combinations of these positions, depending on the influence of the other factors affecting the subjective pattern.

Disparity of the two patterns in the vertical direction and, generally speaking, an overall disparity, may be interpreted (Fig. 13) as displacement unsymmetrically to the median plane.

Artificially introduced size disparity will change the subjective pattern, as compared to its objective field, in conformity with the above relations. Such disparities can be introduced by means of glasses described in my Patent No. 1,933,578.

(D) *Shift of station point.*—When artificial differences between the two ocular images are introduced by size lenses, such as above pointed out, namely, (1) changing the cyclo relationship; (2) changing the asymmetric disparity; and (3) increasing one image horizontally or vertically or overall, characteristic apparent relative shifts of objects to the observer result due to the particular kind of disparity introduced.

Figure 14:
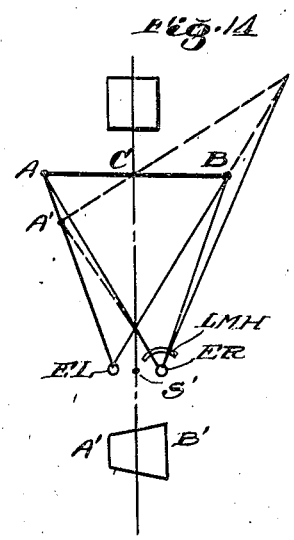

For example, if an observer is looking at a square AB normal to his line of sight as shown in Fig. 14, and the image of the right eye is increased in the horizontal meridian by means of a lens LMH, the resulting disparity clues cause the square to appear in a plane tipped relative to the observer, as shown by A' B'. The apparent inclination of this new plane is determined by the intersection of the new directional values introduced in the right eye by the lens, with the corresponding directional values of the left eye.

When the apparent relative inclination of the square AB to the observer's station point S' (Fig. 14) changes, the apparent form of the square must also change. Its new subjective image is given by the projection of the square from the observer's station point S' on the plane A' B'. It is trapezoid as shown, which change illustrates the previously mentioned inherent relationship between the apparent localization and apparent form.

Recapitulating, if there is an object of a given form with the points which define the surfaces of the object in particular directions from the eyes and the disparity between the two patterns or ocular images is changed, the surfaces of the object will appear shifted to new positions and the form in the subjective image of the object will be determined by the projection of the object defining points on the newly positioned surfaces or, in other words, if the relation between the station point and the new apparent position of an object resulting from changed disparity is known, the new subjective image of the object can be determined by projecting from the station point the points of the objective field on the surfaces in their new apparent position.

Figure 15:
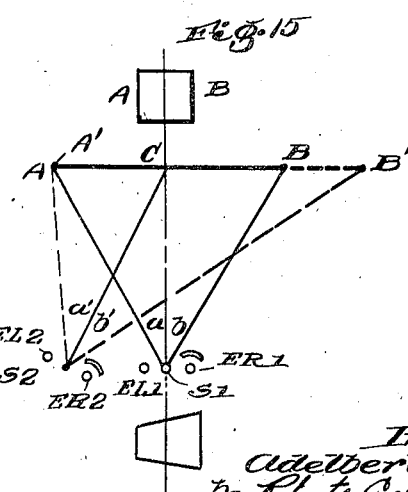

This new subjective pattern can be obtained either by considering the station point as remaining fixed and considering the object to have shifted relatively thereto, as shown in Fig. 14, or by considering the position of the object surfaces to have remained fixed and the station point to have shifted relatively to it. This latter case is shown in Fig. 15.

The object AB remains in its original plane, namely, the frontal plane of the observer. The station point of the observer is kept in the same relative position to the plane A' B' by shifting it from $S^1$ to $S^2$, the angle A' C $S^2$ (Fig. 15) remaining the same as the angle A' C S' in Fig. 15. The apparent new form (subjective image form) is given, as above described, by projecting the angles subtended by the object at the original station point $S^1$ (angles $a$ and $b$) from the new station point $S^2$ ($a'=a$ and $b'=b$) on the plane of the object AB. The new form is given by A' B'.

It should be noted that the plane of AB has to be extended.

This phenomenon can therefore be stated as follows: The apparently changed form of an object associated with an apparent change in the position of the station point to the objective field, resulting from introducing abnormal differences in the disparity of the ocular images, is given by projecting the angles subtended by the object at the original station point from the new station point on the surfaces or planes of the original object as extended if necessary.

It should further be noted that in the above example not only does the station point shift to the left but also that the direction of the median plane from the new station point has tipped to the right so that it intersects the original median plane at the center of the object.

In general when enclosed spaces are observed instead of isolated objects, this tipping of the median plane does not take place. But otherwise the laws for determining localization and form of separate objects hold, as will now be explained by way of example with reference to Fig. 16. In this figure, the enclosed space CABD is observed from $S^1$ with a size lens LMH that shifts the station point to $S^2$. The surfaces and planes of the original object CABD as defined by the angles $a$, $b$ and $c$, are projected with the same angles from the new station point $S^2$ on the surfaces or planes, actual or extended, of the original figure, and furnish the apparent (subjective image) form C A' B' D.

As mentioned above, in this case of an enclosed space the direction of the median plane from the new station point $S^2$ remains parallel to that at the original station point $S^1$. Functionally this means that the planes and surfaces of an enclosed space determine and fix our subjective median plane while isolated objects do not.

With lenses that shift the station point up and down by introducing cyclo disparity, the same construction holds, as it does with lenses that shift the station point forward and back by introducing asymmetric disparity. The latter shift is illustrated in Fig. 17, which, it is believed, needs no detailed description in view of the above explanations.

The diagrams in Figs. 14 and 15 explain why, when a person with extended arms is observed with a size lens that increases the image in the horizontal meridian of the right eye, the right arm of the person appears longer than the left. This phenomenon is experienced only with objects which give visual clues, other than disparity clues, that prevent the object from appearing tipped; as explained with reference to Fig. 12, this type of disparity could be satisfied by an object to the right of the median plane.

If the objective field or a particular component thereof has a configuration which, in view of its memory values, causes domination of pattern disparity clues by pattern form clues, the above-described shift will not occur. If the object field consists of two types of objects, one open to reinterpretation due to changed pattern (ocular image) disparity and the other not, the component of the first type may in the subjective pattern appear shifted, and that of the second type not. For example, when looking at a cube with two arms attached to it, with a lens increasing the horizontal size before one eye, the subjective image of the cube will not be affected whereas the arms will change their apparent localization and form in a manner depending on the various contributing factors of spatial interpretation.

That the above discussed apparent shift of the station point actually occurs is evidenced by the universal experience with the various types of anomalous disparity as introduced by lenses in environments where form values are not so dominant that they determine the localization of the objects.

Recapitulating, under normal environmental conditions (1) lenses that introduce an anomalous excyclo disparity cause the observer to have the experience that he is farther away from the ground or floor and nearer a ceiling. With lenses that introduce incyclo disparity he experiences being nearer the ground or floor and farther from a ceiling. That is, such lenses shift the observer's station point up or down. (2) With lenses that introduce an asymmetric disparity the observer experiences to be nearer or farther from objects. (3) With lenses that increase the horizontal meridian of one eye the observer experiences a lateral shift of his position to the right or left, as for instance in a hallway or on a road. With lenses that increase the vertical meridian of one eye, the observer experiences a lateral shift to the right or left or a backward or forward shift.

For the most dramatic demonstrations of such apparent shifts of station point, a room of a type which will be described more in detail hereinafter, with rough irregular patterns, such as leaves, on the wall and floor and ceiling should be used. With such a room the experienced shift of station point and the altered appearance of the shapes and positions of the walls and ceiling and floor are all such as would be demanded for a given shift of station point while still retaining the directional values of the original station point.

That this is the correct explanation of the visual experience can be checked by designing distorted rooms of such form that, at the assumed new station point, the surfaces subtend the same angular direction which they subtended at the old station point. Such distorted rooms reproduce the appearances experienced when looking at a rectilinear room with the particular disparities that produced the assumed shifts of station point. Referring for example to Fig. 16, ABCD would be the plan of a rectangular room which, when looked at from $S^1$, say with a lens that increases the right image in the horizontal meridian by 4%, appears as shown by A' B' C D seen from $S^2$. If a room of shape A' B' C D is built (Figs. 3 and 4 show such a room) and viewed from $S^2$ without glasses, it of course appears distorted. But if a glass of 4% is put on the left eye it appears like the rectilinear room ABCD. The explanation is that the lens on the left eye shifts the station point as controlled by disparity clues over to $S^1$ and as the directional (pattern form) values from $S^2$ are those that are experienced in a rectilinear room, the total experience is that the observer is looking at a rectilinear room from S¹.

Similar experiences result with rooms similarly constructed for shifting the station point up or down and forward and back.

Models of the above-described type can be supplemented, especially for demonstration purposes, with objects which emphasize the significance of these phenomena. For example, a distorted room 250 (Fig. 18) with slanting floor 251 may be equipped with a slightly inclined chute 252 arranged near the floor for conveying balls 253 from one side wall 254 to the other side wall 255. If the room is observed with spectacles of the above discussed type, which tilt the floor into horizontal position 251' conventionally associated with floors, the chute will appear slanted as indicated at 252' with the balls rolling on it rather steeply uphill. Or, a ball may be hung on a string from the ceiling and caused to rotate in a circular path. This ball can be made to appear as moving along a titlted ellipse at varying speed and with varying size and shape. The reasons which underlie these phenomena can be mathematically derived, but it is believed to be unnecessary for purposes of explaining the present invention to relate such quantitative deductions.

The whole phenomenon is similar to the shift of station point resulting from looking into a mirror, but with the following basic difference: Mirrors which shift one's station point by the well known laws of projection, change both the form clues and the disparity clues that reach the eyes. Anomalous changes (as with size lenses) in the congruity of the ocular images change only the disparity clues, the form clues remaining the same. If the disparity clues are strong as compared to the form clues, there is an unequivocal shift of station point. If the relative strength is of the same order, there will be a conflict, and there may or may not be a shift. If the form clues are dominant they will control and the disparity clues will be suppressed.

(IV) *Significance of pattern form and disparity*

It will now be evident that visual space perception is effected by various factors, two of which are especially important and (although in character essentially different) interdependent in the formation of the subjective image, namely, on the one hand the form of each individual monocular pattern or ocular image as determined by its directional values, and on the other hand the binocular disparity of the patterns or ocular images of the two eyes, respectively. These will herein be referred to for short as "pattern form" or "monocular factor" and "pattern disparity" or "binocular factor." In the average visual environment, both factors are available, confirm each other, and are fully operative. Under certain peculiar conditions (determined by visual environment, visual anomalies, habits of visual response, artificially affected stimulus patterns) either pattern form clues or pattern disparity clues may dominate even to the extent of complete suppression of the other, depending on the weight and consistency of the clues of the respective types.

The correlation of these two main factors of visual space perception can be variously affected. Changes in the objective field may affect the respective clues to different degrees regarding their influence upon space perception. Such changes can be brought about by mechanical rearrangement of environment or movements of the observer within the environment or, if the objective field is represented by a reproduction of actual environment (for example by stereo motion picture projection) by mechanical or optical changes at some step of the process of artificial reproduction of environment.

The correlation of these two factors may further be changed during transmission of the light from objective field to retina, for example by lenses before the eyes or physiological or pathological effects within the eyes.

Finally, physiological or psychological factors may affect one or the other factor of space perception on the transmission path from dioptric to subjective image.

It should be noted that many changes in the objective field have their counterpart in influences effective during the transition from objective field to subjective image; in other words, such phenomena are, generally speaking, reversible, compensatable and reproducible in different regions of the complex comprising object, reception mechanisms and consciousness.

Abnormal correlation of the two main factors or phases of visual space perception is of material importance to the individual. It affects his conception of his spatial relation to his environment which in certain professions (as for example aeronautics) is vital, but of more or less importance in any walk of life if it causes differences between subjective pattern and objective field which can not be easily compensated. Also, the effort of compensating for such differences, or the inability to do so may be the cause of serious discomfort or even illness.

Evidently, the interrelation of the monocular and binocular space perception factors can be affected by varying one or the other or both, or by entirely eliminating one or the other. Pattern form clues depend primarily upon the objective field whereas spatial localization due to pattern disparity clues can be readily influenced by controlling this disparity along the optical path from objective field to retina. Since changes in pattern disparity originating elsewhere have effects wholly analogous to those brought about by the above control, the latter will be discussed more in detail, which will permit easier and shorter explanation of other controls. This pattern disparity control is accomplished by inserting in that optical path lens elements suitable for controlling the relation of the patterns on which binocular space perception is based.

The main types of pattern disparity have been discussed above, and the types of optical lenses suitable for changing such disparity have also been mentioned. Recapitulating, (1) cyclo disparity can be controlled by means of meridional size glasses arranged before the eyes with inclined axes, of the type described in Patent No. 2,230,993; (2) asymmetric disparity can be controlled by means of prismatic glasses of the type described in my Patent No. 2,118,132; and (3) size disparity, either overall or meridional, can be controlled by glasses of the type described in my Patent No. 1,933,578.

(V) *Demonstrating and testing method and apparatus*

The above forms the theoretical basis for various practical embodiments of the present invention which deals generically with the control of the relation of pattern form and disparity, respectively, as affecting space perception, and with the control of pattern disparity and pattern form as affecting that relation. One such embodiment is the demonstration of the formation of a subjective image, its similarity or dissimilarity to the objective field, and its dependency upon pattern form and disparity, respectively, and the latter's interrelation. Other embodiments are tests for visual anomalies based on the control of especially selected patterns, and tests for the character of the factors controlling the visual perception of a given individual, their suppression or dominance. A further embodiment is a method of orthoptics providing fusion exercises through observation of three-dimensional object fields controlled according to the above principles governing space perception. Still another embodiment is the reproduction of peculiarities of the subjective image as caused by normal or abnormal physiological functions which are part of one's visual consciousness.

Apparatus will now be described which lends itself to carrying out certain basic steps of the method according to the invention, and various embodiments of this method itself will then be explained.

In Figs. 19 and 20, a cabinet 1 of suitable dimensions (about 10' x 10' x 10' was found practical) may either be a room proper or a compartment built into a room. Walls 2, 3, 4, ceiling 5, and floor 6 are provided with target boards 12, 13, 14, 15 and 16, respectively, for example of the type to be described hereinafter more in detail. These targets may consist of rotatably supported flat boards, the boards having contours and surface texture substantially eliminating pattern form clues; for example, the contours may be trapezial and the surface may be covered with leaves of irregular shape or with balls, as will be described with reference to Figs. 32 to 36.

If desired the target boards may be arranged for shifting by mounting them on platforms or carriages 40 supported with rollers 40a on tracks 6 or 6a and controlled by ropes or similar means 40b. It will be understood that target carriages of this type can be arranged for adjustment in either direction of the plane of a wall, floor, or ceiling to which the target is fastened.

Arrangements for further adjustment of certain or all targets may be provided as for example indicated in Fig. 21. In this figure, 21 is the target, 22 a four-legged support for a ball and socket joint, 23 and 24 are wires fastened to extension 25 of ball 26 and determining the position of board 21 and leading to a control device located near the person to be tested, or the clinician, as for example explained with reference to Figs. 11 and 12 of the above Patent No. 2,168,308. To the upper side of ball 26 is fastened a gear box 27 containing a small electromotor 28 with leads 29 and worm 30, a worm wheel 31 meshing with worm 30 journaled in sleeve 32 fastened to housing 27 and forming a nut for a threaded and splined spindle 33 fixed to target plate 21. It will be evident without detailed explanation that by means of a conveniently located push button control, plate 21 can be axially adjusted by means of motor 28 turning gear wheel 31 in either sense which will move spindle 33 with the plate in either direction, and that by means of ropes or wires 23, 24 the plate can be tilted about any axis through the center of the ball and socket joint.

The patient may be placed on a seat 8, running on wheels 9 and being adjustable as to height as indicated at 10, so that the relative location of test device and patient can be definitely and reproducibly determined. More elaborate devices for that purpose, as clinical chairs running on tracks and provided with head rests locating eyes ER and EL (compare also Fig. 12 of Patent No. 2,168,308) may be used if particular exactitude is desired. Simple tests can be carried out with the patient standing on floor 6.

The cubicle walls 2 to 6 may have curved corners and be painted a dull black or they may prominently display pattern form (perspective) clues; the targets 12 to 16 are illuminated in such a manner that only they are plainly visible whereas the light source is hidden. For example, lamps 35 may be suspended over and somewhat back of the patient, and have optical means providing suitably diffused light striking the targets only. Or, the targets may be translucent and illuminated by lamps arranged therebehind. The background can be illuminated by lamps 36 behind the target plates. The lamps can be provided with dimmers, and it will be evident that by suitable control of lamps 35 and 36, respectively, the pattern form can be rendered more or less dominating or effectively eliminated. If this device is used for testing vision with pattern disparity clues only, the chamber wall can be painted black as mentioned above, and lamps 36 omitted.

If it is desired to vary the outline of a test object surface, for example in order to introduce or eliminate pattern form clues, an arrangement according to Figs. 22 to 24 can be used.

In Figs. 22 and 23, base 22, tilting arrangement 24, 25, 26 and shifting device 27 are similar to those shown in Fig. 21. Fastened to box 27 is, instead of the object table 21 proper, a base plate 201. Fastened to plate 201 are two sleeves 202, 203 guiding two rods 205, 206 with toothed rack portions 207, 208. Fastened to the ends of these rods by means of fork and pin or other suitable joints are four telescopic frame members 211, 212, 213, 214. Journaled in base plate 201 are two pinions 218, 219 meshing with rack portions 207, 208 and fastened to the cores 221, 222 of flexible shafts 223, 224. The other ends of cores 221, 222 are fastened to hand wheels, one of which is indicated at 231, and which are mounted on a stand 232.

As indicated in Fig. 23, the flexible shaft controls are preferably led through trenches or conduits 235, together with tilting control ropes 24 and electric leads 29 for the shifting device.

Frame members 211 to 214 are covered with an elastic sheet 240, for example of rubber, and covered with irregular objects 241 inducing pattern disparity but having practically no effective pattern form. As shown in Fig. 24, the sheet 240 covers and hides the control mechanism thereunder; this figure also indicates that instead of two control rods 205, 206, four such rods can be used, as indicated at 245, 246.

The testing table according to Figs. 22 and 23 can be used by itself against an indifferent background or a background with pattern form or disparity (or both) clues, or in a testing field according to Figs. 19 and 20.

With the aid of test objects of this type, enclosed spaces of any desired shape, distorted or rectangular, can be built up and the pattern form clues gradually changed and entirely eliminated.

If it is desired to use pattern form clues together with less dominant pattern disparity clues, the arrangement shown in Figs. 25 and 26 can be used. In these figures 41 is a cubicle, of dimensions similar to those of chamber 1 (Figs. 19 and 20) but having cut-out portions or windows 41 to 46, behind which are arranged tilting targets 51 to 56, supported similar to those shown in Figs. 19 and 20 but shaped and dimensioned so that the contours are not visible through the windows. It will be evident that the targets can easily be illuminated by invisible lamps, for example as indicated at 36 of Fig. 20. The contours of the targets are invisible and hence of no particular concern; cubicle 41 may or may not be provided with perspective pattern form clues. Pattern form can be substantially eliminated by making the cut-outs with irregular shapes similar to those of the targets of Figs. 19 and 20.

Instead of arranging masking frames and targets comparatively close to each other, a mask hood can be provided surrounding the patient's head on five sides. An embodiment of this type will be especially suitable for use with devices rigidly controlling the position of the patient's head, for example in the manner shown in Fig. 27. In this figure, 60 is a conventional head support, as for example shown in the above patent, mounted on a stand 61 which also carries trial lens holder 62 and aligning sights 63. In addition, a hood 64 is provided, consisting of a box-shaped mask body 65 adjustably mounted on stand 61 and having five cut-outs indicated at 72, 75, 76. Behind these cut-outs are test targets indicated at 82, 83, 85, 86, corresponding to those shown in Figs. 20 and 26. It will be evident that the contours of the targets are hidden from the observer, and that the targets can be arranged for individual adjustment by the patient or by the clinician, for example by means of arrangements similar to Figs. 21 to 24. Floodlights for the targets, invisible to the patient, can be mounted on the hood, as indicated at 78 and 79 of Fig. 27.

In some instances it is desirable to combine pattern form and pattern disparity clues by direct superimposition and to adjust their mutual dominancy or accentuation; for that purpose target tables, as for example shown in Fig. 28, may be used. In Fig. 28 target plate 21, mounted for example as shown in Fig. 21, has screwed thereto distancing pieces 87 carrying a frame 88 surrounding the plate. Stretched over this frame is a piece of gauze 89 to which a suitable perspective pattern is applied for example by painting. Lamps, one of which is indicated at 90, are mounted on frame 88 and directed and masked in such a manner that they illuminate only the pattern disparity surface of plate 21, but not any side or part of the gauze. Plates of this type can be used for example in test devices according to Fig. 26 with walls 42 to 46 carrying a perspective suppressing pattern and cut-outs of irregular shape. The only pattern form clue will then be that painted on gauze panels 89 and that clue can be made to disappear by extinguishing all lamps with the exception of those corresponding to 90 of Fig. 28. On the other hand, by turning off lamps 90 and illuminating the front faces of gauze panels 89, the perspective pattern form is rendered visible and the pattern disparity object on plate 21 disappears. Intermediate conditions can of course be obtained and gradually or suddenly changed to one or the other extreme; in this manner the interrelation of directly superimposed pattern form and disparity clues, respectively, can be detected, examined and objective fields of selected types simulated. It will be evident without further explanation that plate 21 and gauze frame 88 can be arranged for separates independent adjustment, which arrangement offers further possibilities of interrelating the two phases of visual space perception.

The above-described embodiments permit mechanical as well as optical control of the objective field of the patient; optical control is provided by means of lens systems before the patient's eyes, inserted in trial frames or in lens holders such as described with reference to Fig. 27.

A further set-up for my new test is schematically indicated in Fig. 29, where ER and EL are the two eyes of a patient, and WH and WV two series, respectively, of threads, wires or similar elements, arranged in the median and horizontal visual planes of the patient. A mask 100 before the patient's eyes hides the ends of elements WH and WV, which can therefore be suitably fastened to frames or similar mounting means, not shown because unessential. A test target of this type presents to the respective eyes objects practically without pattern form clues essentially equivalent to the vertical targets 12 and 14 of Fig. 19, whereas the horizontal element series WH provides a standard comparison object.

For purposes of demonstration and of qualitative and simple quantitative tests, arrangements simulating conventional environment and dispensing with mechanical adjustments but emphasizing characteristics which give rise to one or the other factor of space perception are used to advantage.

Figs. 30 and 31 illustrate an arrangement preferably of the size of a small cubical room with walls 92 to 96 preferably with rounded corners and throughout covered with three-dimensional surfacing material inducing predominantly pattern disparity, as for example grass rugs, foliage or irregularly distributed balls. An observer may be placed relatively to the device by means of head positioning devices indicated at 30, 62, or in any other way caused to view the device only and not any environment inducing undesired factor of space perception.

An observer having normal vision and being equipped with spectacles of the above-enumerated types will observe distortions also indicated above with reference to Figs. 9 to 18. Persons who rely for space perception mainly on pattern form will not observe these distortions, or not all of them, or only to a certain degree; persons with certain visual defects (aniseikonia) will observe these distortions without the above glasses, even if they would not normally do so, because these apparent distortions are in everyday life usually suppressed by the dominating pattern forms.

These demonstrations or tests can be supplemented by introducing into such a room—from which pattern form clues have been substantially eliminated—objects which emphasize, demonstrate or more exactly indicate the effects of abnormal or artificially adjusted pattern disparity. For example, objects without perspective characteristics, as for example a ball or an irregular bush, will or will not be apparently distorted in various ways, depending on their location within the test room and on the visual defect of the observer or the disparity changing glasses he is wearing. The above-mentioned chute with ball and suspended ball belong in this category. Disassociation of visual space perception and other types of space perception, as derived from gravitational or kinesthetic clues, can be demonstrated by inducing the observer to move objects (for example a card on a stick) within the room, which will clearly bring out discrepancies between pattern form and pattern disparity.

For reasons explained hereinabove, these tests can also be reversed; for example, a distorted room shown to a person wearing a certain type of pattern disparity changing glasses will assume the conventional cubical shape if the effect of these glasses is opposite to that of glasses which would distort a rectangular room into the actual shape of the distorted room.

With simple non-adjustable set-ups analogous to that shown in Figs. 30 and 31 it is possible to demonstrate the relation between space perception based on pattern form clues and that based on pattern disparity clues, as follows:

If such test objects are shaped as indicated in Figs. 3, 4, 16 and 17, they become especially suitable for demonstrating the above-described shifting of the station point.

Instead of simplifying a testing device according to Figs. 19 to 28 by using fixed surfaces, only a single movable table or plane can be used. Such a device is especially suited for showing the mutual influence of pattern form clues and pattern disparity clues and the suppression— varying with different individuals—of one by the other.

In Figs. 32 and 33, a base 101 supports a column 102 to which is rotatably fastened a target board 103. Board 103 may be provided with a socket 107 and the column with a ball 108 constituting a ball and socket joint around which the target may be rotated relatively to the base. The friction is so adjusted that the target can be easily moved by hand, but will remain in any desired position. The usual rough-surfaced composition building board was found to be a satisfactory material for the target.

Table 103 has beveled sides so that only a single edge appears to the observer of the top surface; this provision eliminates the pattern form clues which might be furnished by two parallel outlines of the table. Those outlines themselves are irregular for the same purpose; the tables may be trapezial as shown in Figs. 34 and 35, or of irregularly curved shape as shown in Fig. 33.

Fastened to the upper surface of the table are three-dimensional objects essentially without pattern form clues, as for example balls 111 or irregular objects as shavings or leaves. These three-dimensional objects are irregularly distributed as indicated in Figs. 34 and 35, so that their subjective pattern has pattern disparity but no pattern form clues.

As an object for comparison representing the gravitational field, auxiliary targets may be provided. Figs. 34 and 35 show for that purpose a plumb bob 115 suspended from arm 116 of stand 117 fastened to base 1; Figs. 32 and 33 show a vertical rod 119 fastened to ball 108 and extending through socket 107.

Further pattern form clues may be superimposed on the pattern disparity clues represented by the table, for example in the shape of a box 121 (Figs. 32 and 33) or any other object furnishing more or less pronounced pattern form clues.

In order to determine the position in space of the table or pattern disparity target, scale means may be provided, for example a semi-spherical bowl 131 (Fig. 36) of transparent material, for example Celluloid, and having a three-dimensional gradation 132. This scale is screwed to the target and contains a heavy object 133, for example a bearing ball. This object will tend to assume the deepest position, thereby indicating angular movements of target 103.

It will be evident that, with arrangements of this type, it becomes possible to vary the weight of pattern form clues in contradistinction to devices according to Figs. 30 and 31 which substantially eliminate pattern form clues.

The small box 121 superimposed on table 103 is dominated by the latter, due to relative size as well as position. Hence, if a discrepancy between objective field and subjective image is present—either pathological, or artificially introduced—the small box will follow that discrepancy, that is, its surfaces will appear tilted; since its pattern form will not agree with the pattern disparity it will appear distorted, the subjective image following the dominating pattern disparity clues of the table. The weight, as to pattern form or disparity, respectively, of any one of two or more objects can be made to vary so that the relative dominance can be controlled and regulated at will; in this manner the characteristics of visual space perception of a person can be demonstrated and investigated.

I found that individual test tables or fields of the type indicated in Figs. 32 to 36 are especially useful for demonstrating the effect of pattern disparity on the interpretation of the position of surfaces, where it is not necessary to make the exact measurements.

It will be evident that by controlling such devices as above described, either pattern form or pattern disparity clues of an objective field, both of a type simulating natural environment, can be made to disappear suddenly or gradually, with the pattern of the other type either absent or coexistent to any desired dominancy.

In the above-described embodiments, the test objects are actual three-dimensional bodies. It is, however, also feasible, and in some instances preferable, to use instead, for demonstration as well as testing, an objective field in the form of two-dimensional images stereoscopically correlated and differentiated for the respective eyes by suitable means, for example with the aid of light polarized in different planes. An embodiment of this type will now be described with reference to Figs. 37 to 39.

In Fig. 37 a translucent screen 149 is mounted between a positioning device 145 for the patient with eyes ER and EL, respectively, and a projector arrangement 150. Two sets of projectors 151*l* and 151*r*, and 152*l* and 152*r*, respectively, are provided with slides 153*l*, 153*r* and 154Z and 154*r* (Figs. 38 and 39) supporting records 156Z, 156*r* and 157Z, 157*r*, respectively.

These records are stereoscopically related, that is, they represent records of an object as seen with the right and left eye, respectively. Polarizing devices, for example the polarizing sheets now available under the trade names "Polaroid" or "Herotar" are placed, with crossed axes, before the respective projectors, as indicated at 161 and 162. Corresponding polarizers 163 and 164 are placed before the patient's eyes. Records 156 represent objects predominantly inducing space perception through pattern disparity, whereas records 157 represent objects essentially inducing space perception through pattern form.

It will be evident that—providing the polarizers are suitably placed in well-known manner (compare for example Patent No. 2,238,207 of April 15, 1941)—the patient will perceive with one eye the image projected by lanterns 151 and with the other eye the image projected by lanterns 152, the total effect being perception of a simulated three-dimensional objective field, provided, of course, that stereopsis is at all present. This pattern will be composed of separately controllable pattern form and pattern disparity clues. Either one or the other can be rendered dominating, or entirely suppressed. By choosing suitable records for slides 153 and 154, it is easily possible to duplicate the above-described test object arrangements, and this simulated three-dimensional objective field permits in addition superimposition and correlation demonstrations and tests which could be carried out only with difficulty or not at all by employing an actually three-dimensional objective field. If desired, a comparison or fixation object identical for both eyes and projected with polarized light can be projected for example with the aid of a third projector 150.

By inserting lenses 165, 166 before the projectors, the subjective image of the patient can be changed, as tilted or moved along the line of vision. Similarly test lenses 167, 168 before the eyes cause apparent spatial adjustment of the objective field. It will therefore be evident that, on the one hand, the field can be brought into an apparent position by means of lenses 165, 166, while this adjustment can be compared to a standard position as it would appear to a normal individual. On the other hand, the subjective pattern can be affected by means of test lenses 167, 168, again as compared with a standard condition for unimpaired vision. Hence this arrangement is fully equivalent to those explained for example with reference to Figs. 19 to 36.

If, instead of slides, motion picture film and appropriate projectors are used, the scope of these demonstrations and tests can be considerably expanded; it is then possible to present to an individual continuously changing pattern form and pattern disparity, including of course objective fields with abnormal pattern disparity. If these are further combined with continuously adjustable pattern disparity control (for example by means similar to those described in the above-mentioned patents, Nos. 1,933,578, 2,118,-132, 2,168,308, 2,230,993 and 2,238,207), demonstrations and tests of all phases of visual space perception becomes possible, including simulation of pathological defects by means of pattern disparity effecting lenses and compensation of actual or simulated defects.

With such equipment it becomes especially possible—and this is perhaps the most important feature of the testing aspect of the present invention—to test directly for those typical variations or components of aniseikonia which are of especial importance as affecting space perception, among them mainly the above enumerated ones of cyclo disparity, asymmetric disparity and size (overall, meridional) disparity. Heretofore, such defects have been mainly measured by determining incongruities of selected points of the ocular images (compare patents, Reissue No. 19,841, Nos. 2,063,015; 2,092,235 and 2,126,713) and by mathematically deducting a correction which will in many instances, but not necessarily, eliminate faulty space perception; tests introduced in accordance with Patent No. 2,168,-308 are an improvement in the right direction but still too abstract as to simulate the actual visual correlation between the individual and his environment.

In carrying out such tests with the herein described equipment, the patient is placed, as above explained, for observation of the test objects. A person having unimpaired vision will report observation of the objects in agreement with the objective field. Checks can be made by applying test lenses for example at 62 (Fig. 27) or at 167, 168 (Fig. 37), which will effect certain predetermined apparent changes in the perception of the test objects. Further, predetermined displacement of the objects from the normal position also permits control observations, also in connection with compensation by means of test glasses at 62 (Fig. 27) or 167, 168 (Fig. 37).

If binocular vision is impaired, the patient will have a subjective pattern which is not in agreement with the objective field. He can then be instructed to change his subjective image (employing the various means at disposal, as trial lenses, position changes of the test objects, changes in dominancy) into conformity with the objective field as known to the clinician, the necessary adjustment indicating the defect. Or, the difference between a definite subjective image and the respective objective field will indicate the nature and amount of the anomaly.

In this connection, it should be noted that a person may react normally to one set of test conditions but abnormally to another. For example, an aniseikonia patient not wearing spactacles affecting his pattern disparity, or wearing one type of such glasses, may react normally upon observing a regular or distorted test object but, with a certain type of glasses, he will have a subjective image quite at variance from that which a normal person would have with the same lenses. This behavior depends upon the various above discussed influences, including memory values and personality (ego), which can be evaluated with a view to arriving at a spectacle prescription of optimum usefulness, only by using such methods as herein described, permitting the relative adjustment and weighing of these factors.

Tests for cyclo disparity and asymmetric disparity reactions differing from those normally to be expected as above described, can be carried out with equipment of the type herein described.

I have found that certain principal settings, as follows, are especially helpful, combinations of only two trial fields being discussed since the significance of other combinations follows logically from those mentioned. The apparent spatial relation of opposite fields, as 12—14 or 15—16 (Fig. 19) may be observed, the patient being asked to set them parallel, or horizontal (15—16) or vertical (12—14), respectively, or to place them symmetrically, or to observe their distance or set them to assume an indicated distance. Further, the apparent spatial relation of adjacent fields as 12—13, 13—14, 13—16, 13—15, 12—15, 14—15, 14—16, 12—16 (Fig. 19) may be observed, the patient being asked to set these fields at right angles, or at other angles or at certain distances indicated to the patient.

It is unnecessary for present purposes to explain in detail the clinical significance of all phases of tests of this nature, as for example of the patient's reports on the appearance of initially horizontal and vertical fields, or purposely displaced fields, of the mutual influence of varying pattern form and disparity, and of the effects of various trial objects, settings and lenses; the previously stated general relationship between certain ocular defects and the appearance of an object will be sufficient for an understanding of the present invention. However, a short report of a simple actual clinical case will be helpful.

A patient was complaining of photophobia, headaches, pain in back of neck, difficulty in focusing and in judging distances, and has felt exhausted generally and nervously. He noticed that floors appeared tipped up in front and that, when looking in a mirror, objects seemed distorted. For ten years he had noticed difficulty in judging his position in relation to other objects even in his room; he had to feel for things to avoid bumping into chairs, tables, etc., and it was impossible for him to drive a car. In walking in the woods he was very much disturbed and felt uncertain. While driving through the woods, he drove the car off the road twice.

The far end of a large hall appeared about four feet higher than that on which he was standing; when he looked out of the window to a parking lot, the surface of which was not paved, the lot appeared to be tipped up markedly instead of horizontal. However, when a car drove onto the parking lot, it suddenly switched back to its normal position.

It will be noted that these symptoms come under the above-mentioned types and that the pattern form factor of the subjective image (a car driving onto the unpaved parking lot) was under certain conditions dominating the pattern disparity factor.

The patient was examined with various types of testing apparatus herein described, especially also such similar to Figs. 30 and 31. It was found that a prescription including a size component 3% × 120° essentially corrects the patient's space perception. Tests with more elaborate instruments for exactly measuring pattern disparities showed that the patient has such disparities of a type and degree which was to be expected from his discrepancy of subjective image and objective field.

It should be understood that the present disclosure is for the purpose of illustration only and that this invention includes all modifications and equivalents which fall within the scope of the appended claims.

I claim:

1. In the art of demonstrating and testing visual space perception represented by the subjective image of a person as determined by the correlation of pattern form and pattern disparity, the method which comprises presenting to both eyes of the person an objective field having a test pattern that produces upon observation with both eyes a subjective image extending to substantial amounts in three dimensions and which pattern has form detail that is effective mainly for inducing form components of the subjective image and which pattern also has disparity detail that is effective mainly for inducing disparity components of the subjective image, regulating the relative effectiveness of said form and disparity details, respectively, in said subjective image of the person, by relatively accentuating and suppressing in said test pattern said form detail and said disparity detail, respectively, and adjusting the effectivity of said disparity component by varying the dissimilarity of the light beams carrying the images of said objective field to the respective eyes until said objective field appears subjectively in a certain form, said form as compared with the form seen by the normal observer indicating the effectiveness of said detail in said person's subjective image.

2. Method according to claim 1 wherein said objective field is presented to the observer in the form of pairs of stereoscopically related pictures of said test pattern arranged for stereoscopic observation.

3. Method according to claim 1 wherein said objective field is presented to the observer in the form of pairs of stereoscopically related pictures of said test pattern arranged for stereoscopic observation, and said relative effectiveness of said form and disparity details is regulated by relatively accentuating and suppressing said form detail and said disparity detail in said pictures.

4. In the art of demonstrating and testing visual space perception represented by the subjective image of a person as determined by the correlation of pattern form and pattern disparity, the method which comprises presenting to both eyes of the person an objective field having a test pattern that produces upon observation with both eyes a subjective image extending to substantial amounts in three dimensions and defining at least two distinct angularly related surface portions, and which pattern has disparity detail that is effective mainly for inducing disparity components of the subjective image, regulating the relative effectiveness of form and disparity details, respectively, in said subjective image of the person, by substantially suppressing in said test pattern any form detail that might be present, and adjusting the effectivity of said disparity component by moving said surface portions relatively to each other until said objective field appears subjectively in a certain form, said form as compared with the form seen by the normal observer indicating the effectiveness of said detail in said person's subjective image.

5. In the art of demonstrating and testing visual space perception represented by the subjective image of a person as determined by the correlation of pattern form and pattern disparity, the method which comprises presenting to both eyes of the person an objective field having a test pattern that produces upon observation with both eyes a subjective image extending to substantial amounts in three dimensions and defining at least two distinct angularly related surface portions and which pattern has disparity detail that is effective mainly for inducing disparity components of the subjective image, regulating the relative effectiveness of form and disparity details, respectively, in said subjective image of the person, by substantially suppressing in said test pattern any form detail that might be present, and adjusting the effectivity of said disparity component by varying the dissimilarity of the light beams carrying the images of said objective field to the respective eyes with optical test lens means before the person's eyes until said objective field appears subjectively in a certain form, said form as compared with the form seen by the normal observer indicating the effectiveness of said detail in said person's subjective image.

6. In the art of demonstrating and testing visual space perception represented by the subjective image of a person as determined by the correlation of pattern form and pattern disparity, the method which comprises presenting to both eyes of the person an objective field having a test pattern that produces upon observation with both eyes a subjective image extending to substantial amounts in three dimensions and which pattern has form detail that is effective mainly for inducing form components of the subjective image and which pattern also has disparity detail that is effective mainly for inducing disparity components of the subjective image, regulating the relative effectiveness of said form and disparity details, respectively, in said subjective image of the person, by relatively accentuating and suppressing in said test pattern said form detail and said disparity detail, respectively, and adjusting the effectivity of said disparity component by varying the dissimilarity of the light beams carrying the images of said objective field to the respective eyes with optical test lens means before at least one of the eyes of the person until said objective field appears subjectively in a certain form, said form as compared with the form seen by the normal observer indicating the effectiveness of said detail in said person's subjective image.

7. A device of the character described for demonstrating or testing space perception of a person, comprising a base, on said base a test target having irregularly arranged detail elements which provide pattern disparity clues but are substantially devoid of pattern form clues, juxtaposed on said base for simultaneous observation with said first target a second test target likewise having irregularly arranged detail elements which provide pattern disparity clues but are substantially devoid of pattern form clues, said two targets being angularly related and together defining a pronouncedly three dimensional system, means for movably mounting and controllably adjusting said test targets relatively to each other, and associated with said base, means for positioning the observer for simultaneous binocular observation of said test targets.

8. A device according to claim 7, comprising optical means for stereoscopically representing said test targets to the observer, said optical means including a pair of stereoscopically correlated records of such targets and means for presenting one of said records to one eye, and the other record to the other eye of the observer for stereoscopic observation thereof.

9. A device of the character described for demonstrating or testing space perception of a person, comprising a base, on said base a test target having irregularly arranged detail elements which provide pattern disparity clues but are substantially devoid of pattern form clues, juxtaposed on said base for simultaneous observation with said first target a second test target likewise having irregularly arranged detail elements which provide pattern disparity clues but are substantially devoid of pattern form clues, said two targets being angularly related and together defining a pronouncedly three dimensional system, associated with said base, means for positioning the observer for simultaneous binocular observation of said test targets, and means for holding before the eyes of the observer test lens means adapted to adjust the disparity of the ocular images of the observer, for observation therethrough of said test targets.

10. A device of the character described for demonstrating or testing space perception of a person, comprising a base, on said base a test target having irregularly arranged detail elements which provide pattern disparity clues but are substantially devoid of pattern form clues, juxtaposed on said base for simultaneous observation with said first target a second test target likewise having irregularly arranged detail elements which provide pattern disparity clues but are substantially devoid of pattern form clues, and on said base superimposed on said test targets a test target frame having detail elements which provide accentuated pattern form clues and permitting observation of said two test targets therethrough, said two targets being angularly related and together defining a pronouncedly three dimensional system, means for movably mounting and controllably adjusting said test targets relatively to each other, and associated with said base means for positioning the observer for simultaneous binocular observation of said test targets and said target frame.

11. Apparatus for demonstrating and testing visual space perception, comprising means for presenting to an observer the appearance of a concave room or box-like structure having at least two adjacent angularly related sides covered with detail elements constituting pattern disparity clues and being deficient in pattern form clues, the intersection of said sides constituting pattern form clues, means for placing the eyes of an observer in a position permitting simultaneous observation of said two sides and of said intersection, and means for holding before the eyes of an observer test lens means adapted to adjust the disparity of the ocular images of the observer, for observation therethrough of said structure, whereby the effectiveness of said disparity clues and said form clues upon the subjective image of the observer may be determined.

12. Apparatus according to claim 11, wherein said means for presenting to an observer the appearance of a box-like structure comprises a pair of stereoscopically correlated records of such a structure and means for presenting one of said records to one eye, and the other record to the other eye of the observer for stereoscopic observation thereof.

ADELBERT AMES, Jr.